Mar. 27, 1923.
F. O. RACE.
SCREW AND THE LIKE.
FILED AUG. 20, 1921.
1,449,779.
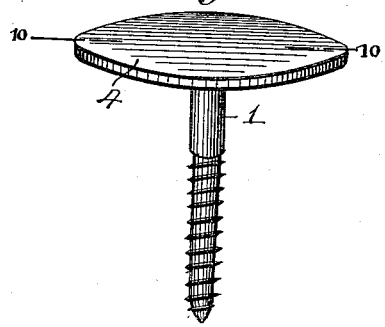
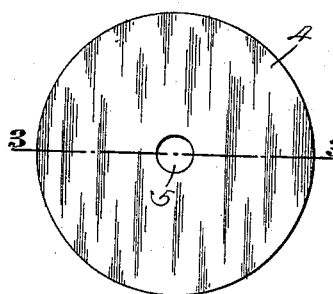 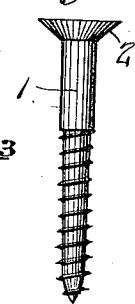 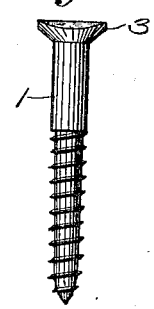 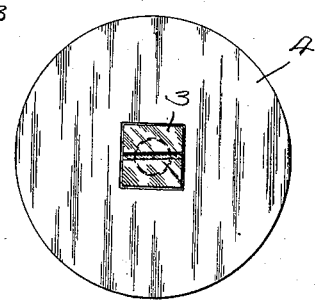
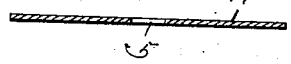   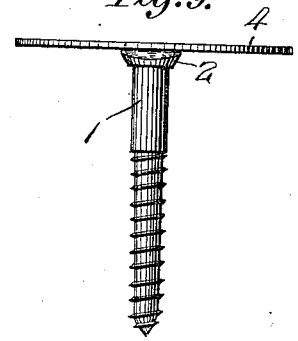
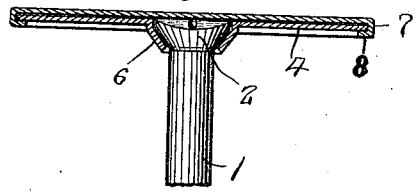
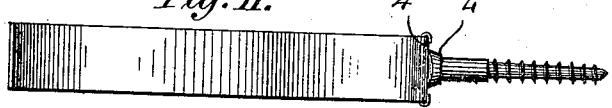
Fred Osmer Race
INVENTOR
BY Mock + Blum
ATTORNEYS.

Patented Mar. 27, 1923.

1,449,779

UNITED STATES PATENT OFFICE.

FRED OSCAR RACE, OF HILLSIDE, NEW JERSEY.

SCREW AND THE LIKE.

Application filed August 20, 1921. Serial No. 493,974.

*To all whom it may concern:*

Be it known that I, FRED OSCAR RACE, a citizen of the United States, residing at Hillside, in the county of Union and State of New Jersey, have invented certain new and useful Improvements in Screws and the like, of which the following is a specification.

My invention relates to a new and improved type of screws and the like having head pieces connected thereto.

Hitherto many attempts have been made to connect a screw or similar threaded member to a metal plate or the like at the head of the screw and my object is to provide a new and improved article of this type.

Another object of my invention is to provide a screw or the like having a bendable metal plate connected to the head portion thereof in a superior manner.

Other objects of my invention will be set forth in the following description and drawings which illustrate a preferred embodiment thereof.

Fig. 1 is a perspective view showing one embodiment of my invention.

Fig. 2 is a top view of Fig. 1.

Fig. 3 is a section along the line 3—3 of Fig. 2.

Fig. 4 is a perspective view showing the screw at one stage of the operations.

Fig. 5 is a top view of Fig. 4.

Fig. 6 is a view showing the screw at another stage of the operations.

Fig. 7 is a top view of Fig. 6.

Fig. 8 is a top view showing how the head of the screw is connected to an adjacent head plate.

Fig. 9 is an elevation of Fig. 8.

Fig. 10 is a sectional view illustrating the completed article.

Fig. 11 is a side view of another embodiment of my invention.

Fig. 12 is a top view of Fig. 11.

An ordinary screw 1 as shown in Fig. 4 and having the usual frustro-conical head 2, has the head out at the top thereof so that the head has a top portion 3 of a substantially square contour and provided with sides parallel to the shank of the screw so that the lower part of the said head has a conical contour while the upper part thereof has a non-circular cross-section. It is obvious that the upper part of the said head could be cut into a variety of shapes having a non-circular cross-section.

A metal plate 4 which has a circular contour has a circular hole 5 punched or otherwise formed therein, the diameter of this hole being preferably less than the greatest diameter of the conical portion of the head of the screw 1. As clearly shown in Figs. 8 and 9, the screw 1 is now inserted into the opening 5 in the plate 4, until it can move no further and then it is forced by means of a punch, press or the like, until the top of the head 2 is substantially flush with the top of the plate 4. As seen in Fig. 10, the central portion of the plate 4, adjacent the hole or opening 5 becomes depressed so as to form a projection 6, having a contour corresponding to the contour of the upper part 3 of the head 2 of the screw 1. Hence the screw 1 cannot turn with respect to the head plate 4, because of the non-circular contour of the top 3 of the head thereof, and the head plate 4 and the head of the screw are fitted together very accurately. In order to more firmly secure the screw to the head plate, a covering plate 7 is provided, the flange 8 of the covering plate 7 being bent under the plate 4.

In the embodiments shown in Figs. 11 and 12, the head plate 4' and the screw 1 are joined in the manner before mentioned, but the head plate 4' is now part of a spring clip 9 which can be used for holding various objects such as canes or the like.

I have shown preferred embodiments of my invention, but it is clear that numerous changes and omissions can be made without departing from its spirit.

What I claim is:

1. In combination, a metal member having a shank and a head having a portion of non-circular cross-section, and a bendable metal plate or the like having the said shank protruding through it and having a projection bent out of the body thereof and of the same contour as the said portion of non-circular cross-section.

2. In combination, a metal member having a shank and a head having a portion of non-circular cross-section, and a bendable metal plate or the like having the said shank protruding through it and having a projection bent out of the body thereof and of the same contour on the said portion of non-circular cross section, and a covering plate connected to the said resilient metal plate.

In testimony whereof I hereunto affix my signature.

FRED OSCAR RACE.